March 22, 1955     W. H. MARTIN     2,704,820
PHASE AND FREQUENCY CONVERSION SYSTEM
Filed Feb. 24, 1951
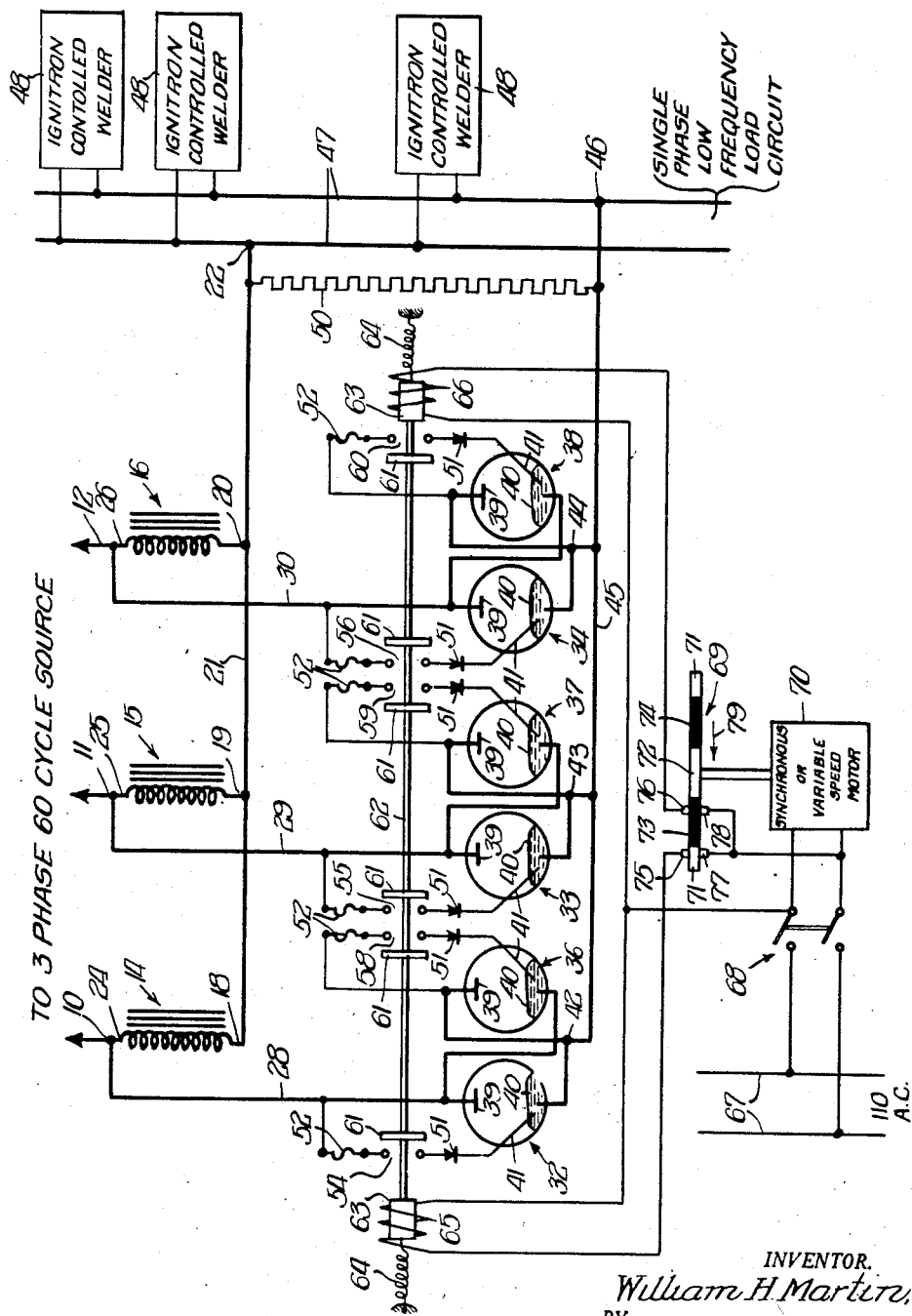
INVENTOR.
William H. Martin,
BY
Robert R. Lockwood
ATTY

United States Patent Office 2,704,820
Patented Mar. 22, 1955

2,704,820

PHASE AND FREQUENCY CONVERSION SYSTEM

William H. Martin, Grosse Point, Mich.

Application February 24, 1951, Serial No. 212,572

3 Claims. (Cl. 321—7)

My invention relates, generally, to phase and frequency conversion systems, and it has particular relation to such systems in which both the phase and frequency are reduced.

Among the objects of my invention are: To convert polyphase alternating current from a polyphase supply circuit of a given frequency, such as sixty cycles, to single phase alternating current of a substantially lower frequency in a new and improved manner for energizing a load circuit; to accomplish this by interposing a single winding inductor between each phase conductor of the supply circuit and one conductor of the single phase load circuit and a pair of inversely connected electric valves between each phase conductor of the supply circuit and the other conductor of the load circuit and rendering conducting the set of valves adapted to conduct successive half cycles of the same polarity and then rendering conducting the remaining set of valves for successive half cycles of the opposite polarity; to render these sets of valves conducting alternately at a rate determined by the frequency of the load circuit; and to prevent simultaneous operation of both sets of valves.

Another object of my invention is to overcome the disadvantages inherent in the system disclosed in Leathers et al. Patent No. 2,356,859, issued August 29, 1944, in which a polyphase transformer is interposed between the polyphase supply circuit and the single phase load circuit with the attendant expense, losses and inflexible and inefficient operation.

Other objects of my invention will, in part, be obvious and in part appear hereinafter.

My invention is disclosed in the embodiment thereof shown in the accompanying drawing and it comprises the features of construction, combination of elements and arrangement of parts which will be set forth in the following description and the scope of the application of which will be defined by the appended claims.

For a more complete understanding of the nature and scope of my invention, reference can be had to the following detailed description taken together with the accompanying drawing in which the single figure illustrates, diagrammatically, one manner in which my invention can be practiced.

Referring now particularly to the drawing, it will be observed that the reference characters 10, 11 and 12 designate conductors which it will be understood are connected for energization to a three phase sixty cycle source. Such a source is shown and referred to for illustrative purposes. It will be understood that a source of different phase and frequency can be employed. The conductors 10, 11 and 12 are connected, as shown, for energizing impedance devices in the form of iron cored inductors 14, 15 and 16. The inductors 14, 15 and 16 can be single windings located on individual cores as shown.

One end 18, 19 and 20 of the inductors 14, 15 and 16 is commonly connected by a conductor 21 to a load circuit terminal 22. Reference will be made presently to the particular type of load circuit of which terminal 22 constitutes a part.

The other ends 24, 25 and 26 of the inductors 14, 15 and 16, which are conductively connected to the supply conductors 10, 11 and 12 respectively, are connected by conductors 28, 29 and 30 to electric valves 32, 33 and 34 of the ignitron type and also to electric valves 36, 37 and 38 which are inversely connected with respect to the valves 32, 33 and 34 respectively.

The electric valves 32, 33, 34, 36, 37 and 38 are of conventional design. Each includes an anode 39, a mercury pool cathode 40 and a control electrode 41. The electric valves 32—36, 33—37 and 34—38 have terminals 42, 43 and 44, respectively, which are commonly connected by a conductor 45 to a second load circuit terminal 46. Now it will be observed that the load circuit terminals 22 and 46 are connected to a pair of conductors 47 which comprise the load circuit. As illustrated one or more ignitron controlled welders 48 can be connected for energization from the load circuit comprising the pair of conductors 47. As will appear hereinafter the load circuit is energized with single phase alternating current having a frequency which is substantially lower than the frequency of the source that is employed for energizing the inductors 14, 15 and 16. For example, the frequency at which the conductors 47 are energized may be of the order of from ten to twelve cycles per second. Each of the ignitron controlled welders 48 may be provided with conventional individual timing control therefor. Alternatively, the load circuit terminals 22 and 46 may be connected to energize the primary winding of a welding transformer in lieu of energizing the load circuit represented by the conductors 47. In such case suitable timing control circuits can be employed for controlling the energization of the control electrodes 41 in the several electric valves referred to hereinbefore. Such timing control means would be in addition to the control means now to be described which render the electric valves conducting in such sequence as to effect the desired phase and frequency conversion.

In the event that no load is connected across the load circuit represented by the conductors 47, it is desirable to maintain current flow through the various electric valves. For this purpose a dummy load resistor 50 may be connected between the conductors 21 and 45 as shown.

It will be understood that various well known control circuits can be employed in conjunction with the control electrodes 41 for controlling the firing of the valves 32, 33, 34, 36, 37 and 38. Since such control circuits per se form no part of the present invention only the simplest form of control circuit will be illustrated. This circuit may include a rectifier 51 and a fuse 52 for each of the valves and, as shown, it is connected between the control electrode 41 and the corresponding anode 39.

Now it is desirable to render the valves 32, 33 and 34 conducting during successive half cycles of one polarity and then to render electric valves 36, 37 and 38 conducting during successive half cycles of opposite polarity. For this purpose normally open contacts 54, 55 and 56 are interposed in the control circuits for the control electrodes 41 associated with the valves 32, 33 and 34. Likewise normally open contacts 58, 59 and 60 are interposed in the control circuits for the control electrodes 41 associated with the electric valves 36, 37 and 38. These contacts are arranged to be bridged by contacts 61 which are carried by a common stem 62 that has armatures 63 at its ends. Tension springs 64 are provided at the ends of the stem 62 for holding it in a neutral position where the bridging contacts 61 are out of engagement with the contacts 54, 55, 56, 58, 59 and 60.

With a view to moving the stem 62 first in one direction and then in the other, operating windings 65 and 66 are provided. These windings 65 and 66 may be energized from a suitable current source such as a source represented by the conductors 67 which may be 110 volt sixty cycle alternating current source. Preferably the conductors 67 are connected to the same source which energizes the conductors 10, 11 and 12 referred to above. A switch 68 is interposed between the conductors 67 and the operating windings 65 and 66. In addition, a commutator, shown generally at 69, is interposed in this circuit and it may be driven by a synchronous or variable speed motor 70 which is energized when the switch 68 is closed.

It will be observed that the commutator 69, which in the drawing is shown in developed form, includes conducting segments 71 and 72 and insulating segments 73 and 74. These segments are arranged to cooperate with brushes 75 and 76, connected respectively to the windings 65 and 66, for controlling their connection to brushes 77 and 78 which, as shown, are commonly connected to one of the conductors 67 through the switch 68.

In operation and assuming that the conductors 10, 11 and 12 are energized from a suitable three phase source of sixty cycle alternating current and that the conductors 67 are similarly energized, the switch 68 is closed. This energizes the motor 70 and causes it to drive the commutator 69. Assuming that the brushes 75 and 77 are bridged by the conducting segment 71, operating winding 65 is energized and contacts 54, 55 and 56 are closed. This serves to render valves 32, 33 and 34 conducting during successive half cycles of the same polarity. Each valve 32, 33 and 34 may be rendered conducting only once during this cycle of operations or they may be rendered conducting repeatedly depending upon the time that the brushes 75 and 77 are bridged by the conducting segment 71. This in turn is determined by the speed at which the commutator 69 is driven and this is determined by the frequency at which it is desired to energize the load circuit represented by the conductors 47.

The insulating segment 73 then is moved between the brushes 75 and 77 with the result that the operating winding 65 is deenergized. Contacts 54, 55 and 56 are opened and valves 32, 33 and 34 cease to conduct. Thereafter, brushes 76 and 78 are bridged by the conducting segment 72 since it is assumed that the commutator 69 is being rotated in the direction indicated by the arrow 79. Thereupon operating winding 66 is energized and contacts 58, 59 and 60 are bridged. Valves 36, 37 and 38 then are rendered conducting during successive half cycles of polarity which is opposite to the polarity for which the valves 32, 33 and 34 are rendered conducting. As before, the valves 36, 37 and 38 may be rendered conducting only once during the time that the brushes 76 and 78 are bridged. Also they may be rendered conducting several times depending upon the speed of movement of the conducting segment 72.

The result of such operation of the valves 32, 33 and 34 conducting successive half cycles of one polarity and then the electric valves 36, 37 and 38 conducting successive half cycles of the opposite polarity is to energize the load terminals 22 and 46 with alternating current at a frequency which is substantially lower than the frequency with which the conductors 10, 11 and 12 are energized. As indicated above, this frequency may be of the order of ten to twelve cycles or more per second.

This application is a continuation-in-part of application Serial No. 54,073, filed October 12, 1948, now abandoned.

Since certain changes can be made in the foregoing construction and system and different embodiments of the invention can be made without departing from the spirit and scope thereof, it is intended that all matter shown in the accompanying drawing and described hereinbefore shall be interpreted as illustrative and not in a limiting sense.

I claim as my invention:

1. A system for converting polyphase alternating current of a given frequency to energize the terminals of a load circuit with single phase alternating current of a lower frequency comprising, in combination, impedance devices corresponding in number to the phases of the polyphase alternating current commonly conductively connected at one end to one terminal of said load circuit, polyphase supply circuit means conductively connected respectively to the other end of each of said impedance devices, a pair of inversely parallel connected electric valves connected between said other end of each impedance device and commonly connected to the other terminal of said load circuit, a control electrode in each valve; circuit control means including a first set of separable contact means connecting the control electrode of one of said electric valves of each pair to said other end of the corresponding impedance device, and means mechanically interconnecting said first set of separable contact means to close and open the same simultaneously; circuit control means including a second set of separable contact means connecting the control electrode of the other of said electric valves of each pair to said other terminal of said load circuit, and means mechanically interconnecting said second set of separable contact means to close and open the same simultaneously; operating means operatively connected to said means interconnecting said sets of separable contact means and arranged and adapted to operate said sets sequentially, and means mechanically interconnecting said first and second sets of separable contact means whereby when one set is closed the other is open and vice versa.

2. A system for converting polyphase alternating current of a given frequency to energize the terminals of a load circuit with single phase alternating current of a lower frequency comprising, in combination, polyphase supply circuit means having a neutral point, circuit means conductively inter-connecting said neutral point and one terminal of said load circuit, a pair of inversely parallel connected electric valves conductively connected between each phase conductor of said polyphase supply circuit means and commonly connected to the other terminal of said load circuit, a control electrode in each valve; circuit control means including a first set of separable contact means connecting the control electrode of one of said electric valves of each pair to the corresponding phase conductor, and means mechanically interconnecting said first set of separable contact means to close and open the same simultaneously; circuit control means including a second set of separable contact means connecting the control electrode of the other of said electric valves of each pair to said other terminal of said load circuit; and means mechanically interconnecting said second set of separable contact means to close and open the same simultaneously; operating means operatively connected to said means interconnecting said sets of separable contact means and arranged and adapted to operate said sets sequentially, and means mechanically interconnecting said first and second sets of separable contact means whereby when one set is closed the other is open and vice versa.

3. A system for converting three phase sixty cycle alternating current to energize the terminals of a load circuit with single phase alternating current of a lower frequency comprising, in combination, three single winding inductors each having a magnetic core individual thereto commonly conductively connected at one end to one terminal of said load circuit, three phase supply circuit means conductively connected respectively to the other end of each of said inductors, a pair of inversely parallel connected electric valves connected between the other end of each inductor and commonly connected to the other terminal of said load circuit, a control electrode in each valve; circuit control means including a first set of separable contact means connecting the control electrode of one of said electric valves of each pair to said other end of the corresponding single winding inductor, and means mechanically interconnecting said first set of separable contact means to close and open the same simultaneously; circuit control means including a second set of separable contact means connecting the control electrode of the other of said electric valves of each pair to said other terminal of said load circuit, and means mechanically interconnecting said second set of separable contact means to close and open the same simultaneously; and operating means operatively connected to said means interconnecting said sets of separable contacts and arranged and adapted to operate the same sequentially, said means mechanically interconnecting said first and second sets of separable contact means being common to all of said contact means whereby when one set of separable contact means is closed the other positively is open and vice versa.

References Cited in the file of this patent

UNITED STATES PATENTS

| 1,394,325 | Meyer | Oct. 18, 1921 |
| 2,356,859 | Leathers et al. | Aug. 29, 1944 |
| 2,431,083 | Sciaky | Nov. 18, 1947 |
| 2,474,867 | Sciaky | July 5, 1949 |

FOREIGN PATENTS

| 295,769 | Germany | May 30, 1914 |